No. 783,550. PATENTED FEB. 28, 1905.
J. B. SMITH.
MONKEY WRENCH.
APPLICATION FILED JULY 22, 1904.

Witnesses.
E. B. Sheffield
F. G. Bauer

Inventor.
J. B. Smith
by
Fred. B. Fetherstonhaugh
Atty

No. 783,550.                                                                 Patented February 28, 1905.

UNITED STATES PATENT OFFICE.

JOHN BACON SMITH, OF AYLMER, CANADA.

MONKEY-WRENCH.

SPECIFICATION forming part of Letters Patent No. 783,550, dated February 28, 1905.

Application filed July 22, 1904. Serial No. 217,667.

*To all whom it may concern:*

Be it known that I, JOHN BACON SMITH, bookkeeper, residing in the village of Aylmer, in the county of Ottawa, Province of Quebec, Dominion of Canada, have invented certain new and useful Improvements in Monkey-Wrenches, of which the following is a specification.

My invention relates to improvements in wrenches; and the objects of my invention are to devise a cheap, simple, and convenient wrench which can be used for nuts of varying sizes and will adjust itself so as to grip the nut automatically, further objects being to make the device such that it may be operated with one hand; and it consists, essentially, of a pair of jaws one of which has a shank integral therewith, one side of the shank being provided with teeth, the end of the shank being slidably held in a hollow handle by means of a compression-spring, one side of which is attached to the shank and the other side of which abuts the end of the handle, the other jaw being provided with an oblique slot through which when the jaw is in its normal position the shank may slide, one side of the slot being designed to engage the teeth on the shank when the jaw is brought substantially normal to the shank, a link being also provided to connect the said jaw to the handle, the various parts of the device being constructed and arranged in detail as hereinafter more particularly described.

Figure 1:
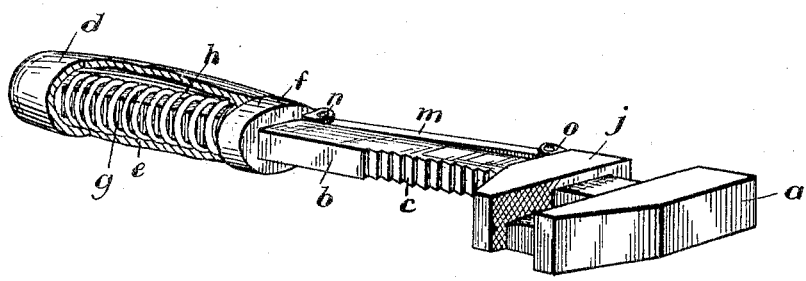
Figure 2:
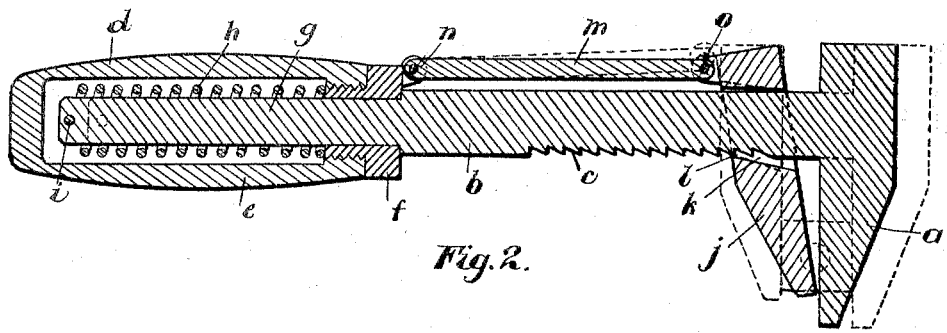

Figure 1 is a perspective view of the wrench, a portion of the handle being broken away to more clearly show the construction. Fig. 2 is a longitudinal section through the center of the wrench.

In the drawings like letters of reference indicate corresponding parts in each figure.

$a$ is one of the jaws integrally connected to the shank $b$. Throughout the specification and claims this will be termed the "movable" jaw.

$c$ represents teeth cut on one side of the shank.

$d$ is a hollow handle, preferably made in two portions $e$ and $f$ and adapted to be screwed together. A slot is cut in the portion $f$, through which the reduced portion $g$ of the shank is adapted to slide.

$h$ is a compression-spring one end of which is securely attached to the end of the shank $b$ at $i$, the other end abutting the inside end of the hollow handle $e$.

$j$ is the stationary jaw. This jaw is provided with an oblique slot $k$, through which when the jaw $j$ is in its normal position the shank $b$ is adapted to slide. The edge $l$ of the slot is so constructed that it will engage the teeth $c$ when the jaw is brought into position substantially at right angles to the shank. This position is shown in dotted lines in the drawings, Fig. 2.

$m$ is a link pivotally secured to the handle at the point $n$ and to the jaw $j$ at the point $o$. The face of the movable jaw $a$ is made substantially longer than that of the jaw $j$, so that when the wrench is extended and placed over a nut the protruding portion of the jaw $j$ will engage the nut.

It will now be seen that on engaging the jaw $a$ with a nut it will be pulled out against the resistance of the compression-spring $h$. When it has been pulled out a sufficient distance, the two edges are allowed to close on the nut. This will cause the jaw $j$ to be brought at right angles to the shaft, causing the side $l$ of the slot therein to engage the teeth in the shank, thus normally locking the wrench, when the nut may be tightened at pleasure.

To release the nut, the pressure exerted is taken off, when the wrench may readily be slipped off the top of the nut.

The advantages of a device of this class are evident. The delay of tightening and adjusting the old form of monkey-wrench is done away with, and thus a great saving of time is secured. Furthermore, it is adapted to be operated by one hand, and so may be used in recesses and other places where it would be impossible to use a wrench requiring two hands to adjust it.

It is to be understood that in carrying out my invention a number of changes may be made in the exact form of construction without materially departing from the spirit of my invention.

What I claim as my invention is—

1. A wrench comprising a hollow handle, a movable shank sliding therein, said shank having a jaw made integral therewith, a jaw $j$ having a hole therein through which the shank extends and a link having one end pivoted to the handle and its other end pivoted to the jaw $j$ so as to allow the said jaw a certain amount of play on the shank.

2. A wrench of the class described comprising a handle having a movable shank slidably held therein and provided with teeth on one side thereof, a compression-spring within the handle adapted to fit around the shank, one end thereof being connected to the shank the other end abutting the end of the handle, a jaw integral with the shank, a stationary jaw the face of which is substantially shorter than that of the movable jaw, a slot in the stationary jaw through which the shank slides when the jaw is in its normal position, one side of the slot being adapted to engage the teeth on the shank when the jaw is brought substantially normal thereto and a link pivotally connecting a point on the handle to the end of the jaw, substantially as described.

Signed at Ottawa, Ontario, this 18th day of July, 1904.

JOHN BACON SMITH.

Witnesses:
FLORENCE CUSHING,
RUSSEL S. SMART.